US011126563B1

(12) United States Patent
Emelyanov et al.

(10) Patent No.: US 11,126,563 B1
(45) Date of Patent: Sep. 21, 2021

(54) SYSTEM AND METHOD FOR TRACKING CHANGES IN SYSTEM MEMORY

(71) Applicant: Virtuozzo International GmbH, Schaffhausen (CH)

(72) Inventors: Pavel Emelyanov, Moscow (RU); Alexey G. Kobets, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

(21) Appl. No.: 15/857,076

(22) Filed: Dec. 28, 2017

(51) Int. Cl.
*G06F 12/128* (2016.01)
*G06F 9/455* (2018.01)
*G06F 12/14* (2006.01)
*G06F 9/50* (2006.01)

(52) U.S. Cl.
CPC ........ *G06F 12/128* (2013.01); *G06F 9/45558* (2013.01); *G06F 9/5088* (2013.01); *G06F 12/1483* (2013.01); *G06F 2009/45583* (2013.01); *G06F 2212/1052* (2013.01)

(58) Field of Classification Search
None
See application file for complete search history.

(56) References Cited

PUBLICATIONS

Linux Programmer's Manual, USERFAULTFD(2), May 6, 2017, retrieved from https://web.archive.org/web/20170506024155/http://man7.org/linux/man-pages/man2/userfaultfd.2.html on Aug. 27, 2019, 12 pages (Year: 2017).*

* cited by examiner

*Primary Examiner* — Gary W. Cygiel
(74) *Attorney, Agent, or Firm* — Arent Fox LLP; Michael Fainberg (57) ABSTRACT

A system and method that tracks changes in system memory executed by a software program. An exemplary method includes referencing a memory access tracking file to a file descriptor of a memory monitoring process and registering one or more virtual memory areas of a tracked process to the memory access tracking file. Moreover, the method includes sending, by the memory access tracking file, event information of a write access to the memory monitoring process that identifies a virtual page, where the write access is performed by the tracked process to the virtual page. Finally, the method includes configuring the virtual page such that the tracked process can execute a subsequent write command to the virtual page.

27 Claims, 5 Drawing Sheets

SYSTEM AND METHOD FOR TRACKING CHANGES IN SYSTEM MEMORY

TECHNICAL FIELD

The present disclosure generally relates to computer memory management, and, more particularly, to a system and method for tracking changes in system memory.

BACKGROUND

In computer systems, computer memory is a limited resource that must be shared by multiple processes. Existing computer systems utilize memory management to dynamically allocate portions of memory to one or more processes executed by the processor. However, many applications utilize a large amount of memory that can result in low memory conditions where no additional memory can be allocated for use by other programs or the operating system.

To manage the load on the node (including, alleviation low memory conditions), computing systems will often migrate processes or virtual environments (VE) from one system to another system which implies transfer of the memory of these processes or virtual environments (VE). However, one problem with conventional migration procedures, especially for migrating processes that work with a large amount of memory, is that process working with the data in memory must be stopped while the whole memory is copied and migrated to a new system. This process can be quite time consuming and lead to significant downtime of the working process (e.g., container, VM or other VE).

To address this problem, certain systems (e.g., hypervisors) have been developed that provide live migration in which the working process remains running during its migration. To facilitate live migration of the processes, the computer system will need to track memory access of the process memory during the migration process. To do so, memory pages usually have read-only access. Thus, when the working process attempts to write some data to a memory page, a page fault will be triggered due to the read-only status. In this instance, the kernel of the computer's operating system (or a hypervisor with help of the kernel) will generate and then handle the page fault, create a mark that the process attempted to write to this page, change the access to read-write access, and release the page for the write operation. Consequently, the process can identify which pages have been changed based on the marking (e.g., access and dirty bits) by the kernel.

However, even this technique suffers from significant technical limitations. For example, when the process asks the kernel to track memory during the migration process, this request will effectively reset the memory tracking. As a result, when the process checks the number/location of changed pages, it will only obtain the pages that have been changed from the point in time of the reset and not from the start of the migration process. This result may lead to inconsistency between pages in the original process memory and the new, migrated process memory where the new process memory might not include all of the changed pages. Therefore, a system and method is needed to accurately and efficiently track changes in process memory during live migration, for example.

SUMMARY

Accordingly, a system and method is provided to efficiently and accurately track changes in process memory. In one aspect, the exemplary computing system runs on a Linux operating system and utilizes a Linux subsystem called userfaultfd that is a "special file" that can be attached to the kernel memory management subsystem of a process that is selected for monitoring. With the userfaultfd, the kernel can generate an event about a page fault triggered by a memory access attempt by the tracked process, rather than simply handling the page fault. Afterwards, any program can read the generated event, decide how to handle the event, and either upload a data page into the kernel to handle the page fault or inform the kernel that no further action is required.

Thus, in on exemplary aspect, a method is provided for tracking changes in system memory executed by a software program. In this aspect, the method includes referencing a memory access tracking file to a file descriptor of a memory monitoring process; registering at least one virtual memory area of a tracked process to the memory access tracking file; sending, via the memory access tracking file, event information of a write access to the memory monitoring process that identifies a virtual page, the write access performed by the tracked process to the virtual page in the at least one virtual memory area; and configuring the virtual page such that the tracked process can execute a subsequent write command to the virtual page.

In another exemplary aspect, the method includes tracking, using the memory access tracking file, page faults generated when the tracked process attempts to execute write commands to virtual pages in virtual memory of the tracked process.

In another exemplary aspect, the method includes delivering, via the memory access tracking file, the event information based on at least one tracked page fault to the memory monitoring process, wherein the event information includes location information of the virtual page that corresponds to the at least one tracked page fault.

In another exemplary aspect, the virtual memory area of the tracked process comprises a whole address space of the tracked process.

In another exemplary aspect, the method includes the virtual memory area of the tracked process comprises one or more address ranges in virtual memory of the tracked process.

In another exemplary aspect, the method includes marking, by the memory monitoring process, the identified virtual page as accessed by the tracked program.

In another exemplary aspect, the method includes temporarily stopping, by the memory monitoring process, the tracked process by loading executable code into address space of the tracked process, wherein the executable code contains instructions for creating the memory access tracking file.

In another exemplary aspect, the method includes sending, by the executable code executed in the tracked process, the memory access tracking file to the file descriptor of the memory monitoring process; and closing the file descriptor of the tracked process corresponding to the memory access tracking file.

In another exemplary aspect, the method includes setting, by the memory monitoring process, write protection to memory pages of the tracked process.

In another exemplary aspect, the method includes setting, by the executable code executed in the tracked process, write protection to the memory pages of the tracked process.

In another exemplary aspect, the method includes updating, by the memory monitoring process, a bitmap of changed virtual pages of the tracked process upon receiving the event information of the write command that identifies the virtual page.

In another exemplary aspect, the method includes migrating process memory of the tracked program based at least partially on the updated bitmap.

In another exemplary aspect, the virtual page is configured such that the tracked process can execute the subsequent write command to the virtual page without occurrence of a page fault in the system memory.

In another exemplary aspect, the method includes configuring the virtual page comprises one of remapping a physical page in kernel space of the system memory as full access for the virtual page such that the tracked program process can execute a subsequent write command to the virtual page; and deleting a write protection from the virtual page depending on a type of the page fault.

In another exemplary aspect, the method includes remapping, by the memory monitoring process, the physical page in the kernel space by sending a link of the physical page to a kernel that remaps the physical page to the virtual page.

In another exemplary aspect, a computing system is disclosed for tracking changes by a software program. In this aspect, the computing system includes system memory; and at least one processor configured to reference a memory access tracking file to a file descriptor of a memory monitoring process; register at least one virtual memory area of a tracked process to the memory access tracking file; send, via the memory access tracking file, event information of a write access to the memory monitoring process that identifies a virtual page, the write access performed by the tracked process to the virtual page in the at least one virtual memory area; and configure the virtual page such that the tracked process can execute a subsequent write command to the virtual page.

In another exemplary aspect a system is provided for tracking changes in memory of a computing system. In this aspect, the system includes a tracked program running in user space and configured to register at least one virtual memory area of the tracked program to a memory access tracking file; a memory monitoring program running in the user space having a file descriptor table including a file descriptor referencing to the memory access tracking file, the memory monitoring program configured to receive, via the memory access tracking file, event information of a access to a virtual memory page in the virtual memory area performed by the tracked program, and mark the virtual page as accessed by the tracked program; and configure the virtual page such that the tracked process can execute a subsequent write command to the virtual page.

The above summary of example aspects serves to provide an understanding of the invention. This summary is not an extensive overview of all contemplated aspects, and is intended to neither identify key or critical elements of all aspects nor delineate the scope of any or all aspects of the invention. Its sole purpose is to present one or more aspects in a concise form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

Figure 1:
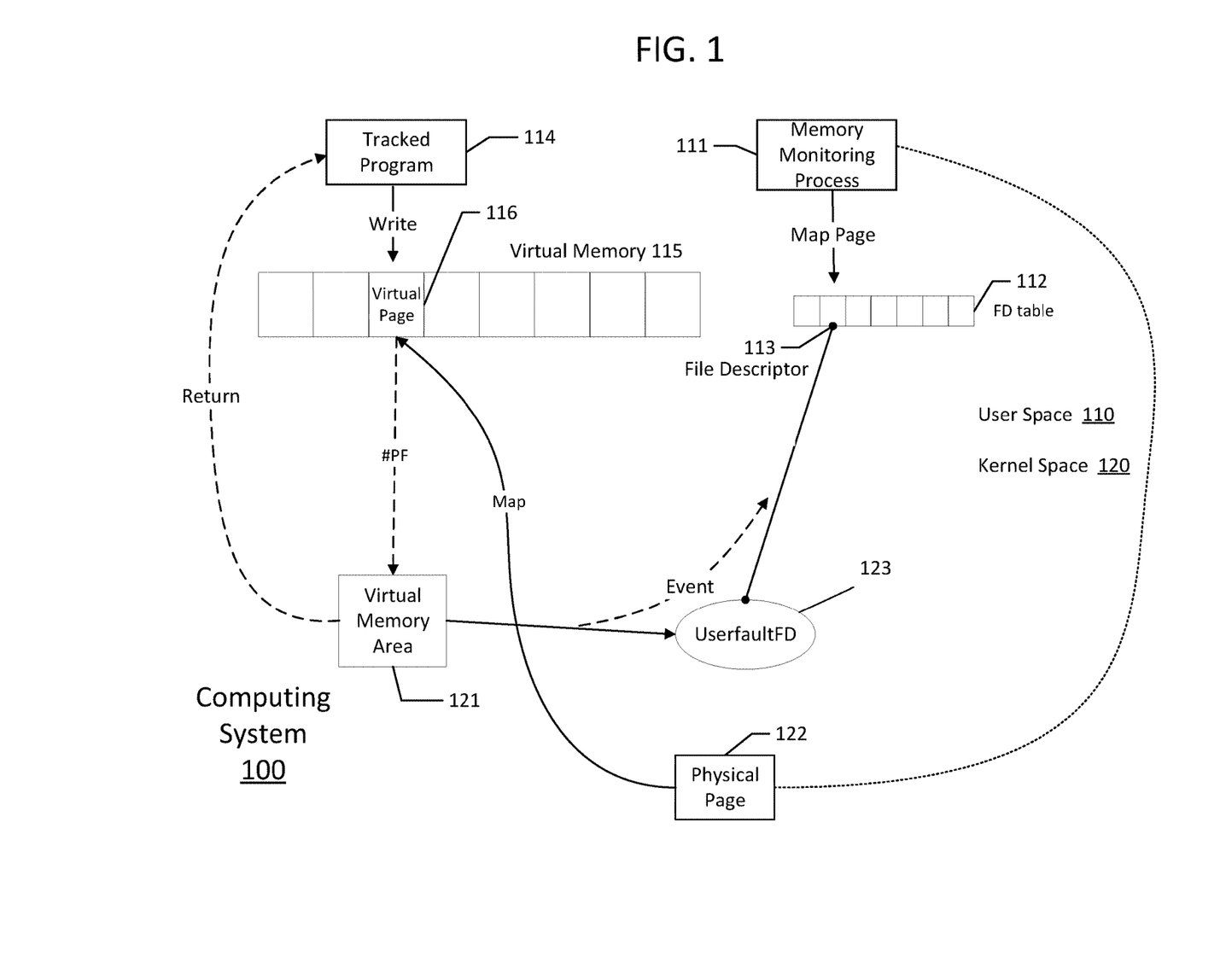
FIG. 1 illustrates a block diagram of a system for tracking changes in process memory according to an exemplary aspect.

FIG. 1 illustrates a block diagram of a system for tracking changes in process memory according to an exemplary aspect. In general, the exemplary system can be implemented on any type of computing system 100 (e.g., a personal computer, laptop, server, etc.) that includes a computer processing unit ("CPU") and electronic memory that includes software for executing the memory access tracking algorithms disclosed herein. Details of an exemplary computer system on which computing system 100 can be provided are described below with respect to FIG. 5.

As shown in FIG. 1, the exemplary computing system 100 can include a memory monitoring process 111 that is configured to track memory access and changes in memory of the computing system 100 that result from operations (e.g., write operations) performed by one or more processes (or program, or thread, or an application, for example), during execution. Here the memory monitoring process 111 can be a specialized software application (or a process or a thread inside of an application) or module that is configured to be executed by the CPU of computing system 100 to track changes made by one or more a processes to processes memory during operation, for example.

In general, as used herein, the term "module" refers to a software service or application executed by a processor of a computer, such as computing system 100. For example, a "module" may be a combination of hardware and software, such as by a processor system and a set of instructions to implement the module's functionality, which (while being executed) transform the computing system into a special-purpose device. Thus, a module can also be implemented as a combination of the two, with certain functions facilitated by hardware alone, and other functions facilitated by a combination of hardware and software. In general, the memory monitoring process 111 can be implemented as a module that can be realized in a variety of suitable configurations, and should not be limited to any example implementation exemplified herein.

According to an exemplary aspect, the computing system 100 can operate using a Linux operating system (or any other OS) that manages the software and hardware components of the system. As further shown, during operation, the Linux operating system will transit between two distinct modes: in user space 110 and in kernel space 120. In an exemplary aspect, the memory monitoring process 111 and the process/program/application that is being monitored (hereinafter referred to as "tracked program 114") both (at least some part of time) operate in user space 110. In some aspects, the processes 114 and 111 can be different processes, in some other aspects, 114 and 111 can be the same process, or 114 and 11 can be different threads of one process. Moreover, the Linux OS kernel will execute its tasks in the kernel space 120. As will be described in detail below, the kernel tasks include the handling of page faults (i.e., "#PF") and the mapping of physical memory to virtual memory, for example. Advantageously, by executing both the memory monitoring process 111 and the tracked program 114 in user space 110, the two processes will not interfere with each other during the tracking process, and, therefore, can be used for efficient and accurate migration, as will become more apparent from the discussion below.

Moreover, it is noted that the tracked program 114 can generally be any type of software application (e.g., user application, such as a word processor, data storage, or the like) that can be run during normal operation of computing system 100. The tracked program can comprise one or more tracked processes, each process can have one or more threads. Moreover, the tracked program 114 has virtual memory 115 managed by the Linux operating system during operation (e.g., program 114 can perform write operations to the virtual memory 115). As further shown, the virtual memory 115 can include a plurality of virtual pages (e.g., virtual page 116) that are managed by the Linux operation system as will be described in detail below.

According to the exemplary aspect, the memory monitoring process (or several processes) 111 (also referred to as a "tracker task") utilizes a Linux subsystem called a "userfaultfd" 123, which can generally be considered a memory access tracking file that enables the memory monitoring process 111 to track memory access operations and changes (e.g., write operations) to the memory by tracked program 114. In other words, the memory monitoring process 111 uses the memory access tracking file (i.e., userfaultfd 123) to track changes in the process virtual memory 115 of tracked process 114. In this aspect, the memory access tracking file can be attached to the kernel memory management subsystem of the tracked program 114 so that the kernel can generate events about the memory access attempts and changes in the process virtual memory 115 rather than simply handling page faults. As a result, the process 111 can subsequently read the generated event, decide how to handle the event, and provide a page to the kernel to handle the page fault or confirm that operation of the tracked program has been executed successfully.

For example, for computing systems using Linux, only a host (i.e., the process itself) can create a file, such as the memory access tracking file, that can be attached to the process. Thus, to overcome this restriction, the memory monitoring process 111 is configured to load "parasite code" into the tracked program 114 that in turn creates the memory access tracking file (i.e., userfaultfd 123) when the parasite code is executed by the tracked program 114. For example, in one aspect, the parasite code can be loaded using Compel, which is a software utility provided to execute arbitrary code in a context of a foreign process (which is, for example, the tracked program 114). More particularly, Compel is part of CRIU ("Checkpoint/Restore In Userspace"), which is a software tool for the Linux operating system provided to implement process checkpoint/restore functionality for Linux. Using Compel, the parasite code can be created, compiled, and linked (e.g., by the memory monitoring process 111). Once compiled with Compel flags and linked, the parasite code can be inserted into and executed in the context of the tracked program 114 with the help of Compel library. In other words, the Compel utility works by connecting to the tracked program 114 using a debugging program interface of the Linux operating system and stopping the tracked program 114 as if it is interrupted at the breakpoint. In the process address space, Compel identifies a white space and writes the binary code (i.e., the parasite code) so that it is loaded into the tracked program 114. Accordingly, using the debugging program interface, Compel changes the registers of the tracked program 114 containing the next instruction to the entry point of the loaded binary code (i.e., parasite code). Then, it gives the command to proceed with the execution of the tracked program 114.

Thus, when executed, the parasite code is configured to create the memory access tracking file (i.e., userfaultfd 123). That is, when the Compel utility gives control back to the tracked program 114 after loading the parasite code, the parasite code will create the memory access tracking file and give (e.g., send its file descriptor via socket) this file to the memory monitoring process 111 (through a Unix socket, for example, as will be discussed below).

With the created userfaultfd 123, the memory monitoring process 111 is now configured to track all memory access attempts that the tracked program 114 makes to the virtual memory 115. For example, as will be described in more detail below, when a page fault is generated, the event generated by the kernel is handled by the memory monitoring process 111 that gets the event, marks (e.g., in the bitmap) what page was changed by the event (e.g., by the write operation) and informs the kernel that no actions are required (or that this page is no longer read-only), for example.

In order to link the userfaultfd 123 to the memory monitoring process 111, a file descriptor table (i.e., "FD table 112") is used, that is maintained by the kernel and will contain a reference or indicator (i.e., a "file descriptor") for the memory monitoring process 111 to index the memory access tracking file (i.e., userfaultfd 123). In one aspect, the file descriptor table 112 forms part of the POSIX ("the Portable Operating System Interface") application programming interface for the computing system 100. For example, each file descriptor in the file descriptor table 112 is a non-negative integer, generally represented in the C programming language as the type "int".

Each process has its own file descriptor table containing file descriptors (e.g., references to files) with which the process can work. As will be described in details below, in some aspects, the parasite code is used for opening memory access tracking file; sending its file descriptor (or the file itself, on some other aspects) to the monitoring process; and deleting the file descriptor, belonging to tracked process and corresponding to the memory access tracking file, from the FD table of the tracked process. After that the parasite code, in some aspects, can be unloaded from the tracked process.

Thus, in the exemplary aspect, the file descriptor 113 serves as an reference (e.g., a file descriptor or its index in process FDT) for the memory monitoring process 111 to access the memory access tracking file. That is, a file descriptor 113 can be a reference to the memory access tracking file created by the parasite code as described above, in order to receive the event generated by the kernel in response to the page fault triggered during operation of the tracked program 114. To access the memory access tracking file, the memory monitoring process 111 can pass the file descriptor 113 to the kernel through a system call, and the kernel will access the memory access tracking file on behalf of the memory monitoring process 111. It should be appreciated that the disclosed configuration can be used for multithreaded applications, for example, where one thread (which can act like the memory monitoring process 111) tracks the page faults by the userfaultfd 123, while the other thread (which can act like the tracked program 114) changes its memory For example, a "page fault" is an exception raised by the computing system 100 when a running program accesses a memory page (e.g., in virtual memory 115) that is not currently mapped into the virtual address space of the process or does not have needed permissions. According to the exemplary aspect, the memory monitoring process 111 is configured to use these page faults to track changes in the process memory. More particularly, when the tracked program 114 attempts to write to a page in the virtual memory 116 (i.e., virtual page 116), the page fault (i.e., "#PF") will be generated, for example, based on a write protection bit set by the memory monitoring process 111 as will be discussed below. In order to handle the page fault, the kernel operating in the kernel space 120 is configured to identify a virtual memory area 121 that is registered to the memory access tracking file (i.e., userfaultfd 123), which is in turn indexed to the file descriptor 113 of the file descriptor table 112 working with the memory monitoring process 111.

As further described above, the memory access tracking file is configured to generate event information relating to the memory access (e.g., write, read, etc.) command, with the event information including identifying information related to the virtual page, such as the location of the virtual page 116 in the virtual memory 115. In turn, the memory monitoring process 111 is configured to receive the event generated kernel by the file descriptor 113. Based on this event information, the memory monitoring process 111 can determine which virtual page 116 the tracked program 114 attempted to write to since the event information includes the information regarding the location of the virtual page 116 in the virtual memory 115.

Once the memory monitoring process 111 has identified the specific virtual page 116, the memory monitoring process 111 can communicate to the kernel (e.g., using the file descriptor 113) that a physical page can be mapped to the tracked program or the permissions should be changed (e.g., write protection bit should be reset). In case of mapping a page, the memory monitoring process 111 can provide a link to a physical page 122 that can be mapped by the kernel to the virtual page 116. In one aspect, the physical page 122 can be a memory page of the memory monitoring process 111 itself. It is note that the "link" can be any identifying information or metadata, for example, that enables the kernel to identify a physical page (e.g., physical page 122) to map into the process address space. In one exemplary aspect, the link is a virtual address in the process address space of the memory monitoring process 111 that is mapped to the allocated physical page (e.g., physical page 122).

Upon receiving this link from the memory monitoring process 111, the kernel is instructed to remap the physical page 122 in the system memory to the virtual page 116 of the virtual memory 115 before returning execution to the tracked program 114. Then, when the tracked program 114 resumes normal execution, any subsequent write operation to the virtual page 116 will be successful since it has been mapped to the physical page 122 and the page fault exception will not be raised during this subsequent write operation.

In some aspects, the monitoring process sets write protection to the memory of the tracked process (e.g., using kernel API), in some other aspects, it is done by the parasite code from inside of the tracked process. Thus, in cases where the page fault occurred because the page was not mapped to virtual memory the page is mapped, and in cases where the page had a set write protection bit (or other permissions were not satisfied) the permissions of the page are reset (e.g., write protection bit is set to zero).

By creating the memory access tracking file, which is linked to the file descriptor 113, the memory monitoring process 111 can accurately track all process memory access operations and changes (e.g., by write operations) to process virtual memory 115 that have been performed by tracked program/process 114 during execution. For example, in one aspect, the memory monitoring process 111 can track the changed pages by creating and continuously updating a bitmap (or any similar data structure) that maps the changed pages (e.g., virtual page 116) to the tracked program 114. Using this constantly updated bitmap, the computing system 100 can perform live migration of process 114.

Figure 2:
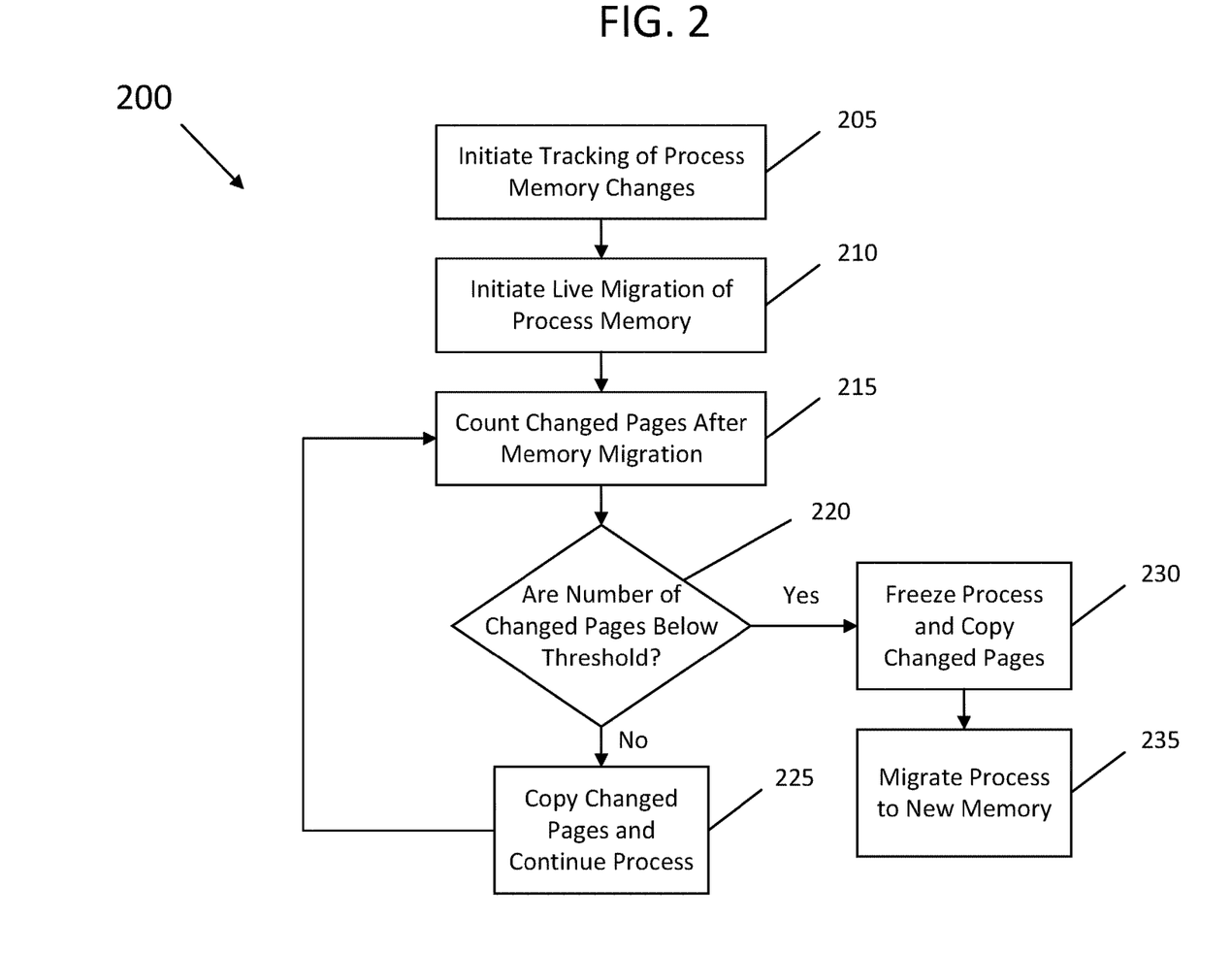
FIG. 2 illustrates a flowchart of a method for performing process live migration according to an exemplary aspect.

FIG. 2 illustrates a flowchart 200 of a method for performing data transfer during process live migration according to an exemplary aspect. As described above, migration includes transferring data between computers. "Live" migration means that the migration is performed while the process continues execution, which implies working on the current data (i.e., with pages in memory). According to the exemplary aspect, the memory monitoring process 111 can efficiently and accurately track changed pages in virtual memory 115 of tracked program 114 is during process live migration.

Thus, as shown in FIG. 2, the tracking of process memory is initiated at step 205, which can include, for example, loading the parasite code into the tracked program to create the memory access tracking file (i.e., userfaultfd 123) as described above. Next, at step 210, the computing system 100 can initiate the data transfer from virtual memory 115 to another node, for example. That is, the transfer of process pages can include copying the data of the virtual pages of virtual memory 115 and sending them via network, for example. At the same time, while the pages are being copied and transferred, the tracked program 114 can continue to run while the memory monitoring process 111 continuously identifies and marks (e.g., in bitmap) changed pages as described above, which include the creating and updating of a bitmap to track the changed pages. After the entirety of virtual memory 115 has been copied, the memory monitoring process 111 can then determine the total number of changed pages in the virtual memory 115 that have occurred since the beginning of the migration (i.e., when the copying of the virtual memory 115 was initiated).

As further shown at step 220, the memory monitoring process 111 is configured to compare the number of changed pages to a predetermined threshold of pages, which can be set by a system administrator, for example. In exemplary aspects, the threshold can be set, for example, by a configuration file, by an environment variable, by command line option, or by an RPC channel between the memory monitoring process 111 and the operator who imitates the monitoring process.

According to the exemplary aspect, if the number of changed pages is greater than the threshold, the method proceeds to step 225 where the changed pages are copied and transmitted to the new location (e.g., send via network to another node). At the same time, the tracked program 114 is continuing to run and the memory monitoring process 111 is continuing to monitor the number of changed pages and identifies pages that were changed after transmitting the previous portion of the process memory (e.g., it zeroes bitmap). The method then returns to step 215 and then to step 220 where the new number of changed pages (i.e., the number of changed pages since step 215 was performed) is again compared with the page threshold. It should be appreciated that each new iteration will likely take less time, and, as a result, the tracked program 114 will make fewer changed to the virtual memory 115 during this time. After each iteration, the number of changed pages are compared with the page threshold at step 220, such that steps 215, 220 and 225 are continuously performed in a loop.

Finally, once the number of changed pages falls below the page threshold, the method proceeds to step 230 where the running program (e.g., tracked program 114) is frozen (i.e., its execution is suspended) while the changed pages are copied and migrated to the new location (e.g., other hardware node). Once the remaining changed pages have been migrated, the tracked program 114 can be migrated by computing system 100 to start working with the data that has been migrated to the new location. In some aspects, at the time, the physical pages mapped to the virtual pages of the virtual memory 115 (e.g., physical page 122 that is mapped to virtual page 116) can be freed for other applications.

Advantageously, using the exemplary system and algorithms described herein, the memory monitoring process 111 can be utilized during the data transferring process for minimizing the downtime of the tracked program 114, (i.e., the amount of time the tracked program must be stopped to perform the migration). As described above, this downtime typically increases with processes that are to be migrated and work with a significant amount of memory. As a result, in conventional systems, the process must be stopped while the whole memory is copied and migrated to a new database. For large amounts of data, the downtime can be significant. In contrast, because the memory monitoring process 111 tracks the memory process independently of the data migration, the tracked program 114 can continue to work with the existing memory (e.g., virtual memory 115) while the data is migrated.

Moreover, conventional data migration systems track memory changes using soft dirty bit technology in which soft dirty bits mark the pages that were changed. In such implementations, the kernel can be asked to track a process's memory either by the code that will migrate the process or by the process itself when it wants to know what pages have been changed. However, as further explained above, once the migration process is started and the tracker is enabled, if the process ask the kernel to track the memory during migration (e.g., using dirty bits), the memory tracker will be reset. As a result, when the changed pages are checked, the system only sees the number of pages that have changed since the reset and not from the migration start.

In contrast, according to the exemplary aspect, because the memory monitoring process 111 and the tracked program 114 both operate in user space 110, the two processes will not interfere with each other, such that the tracked program 114 can continue to work with the data while the memory monitoring process 111 tracks memory access and changes by the tracked program 114. In other words, if the memory monitoring process 111 tracks memory access by the tracked program 114, which in turn asks for the memory access tracking file (i.e., userfaultfd 123), the event (e.g., describing page fault) will be generated and delivered both ways, such that both the tracked program 114 and the memory monitoring process 111 get the required information for its respective process without affecting the operation of the other process. In some aspects, the process 111 can be the same process as 114, in this aspects different treads inside this single process act as a tracked task and monitoring task, and monitoring task can itself create userfaultfd. In some aspects, the event is delivered to the monitoring process via memory access tracking file.

Figure 3:
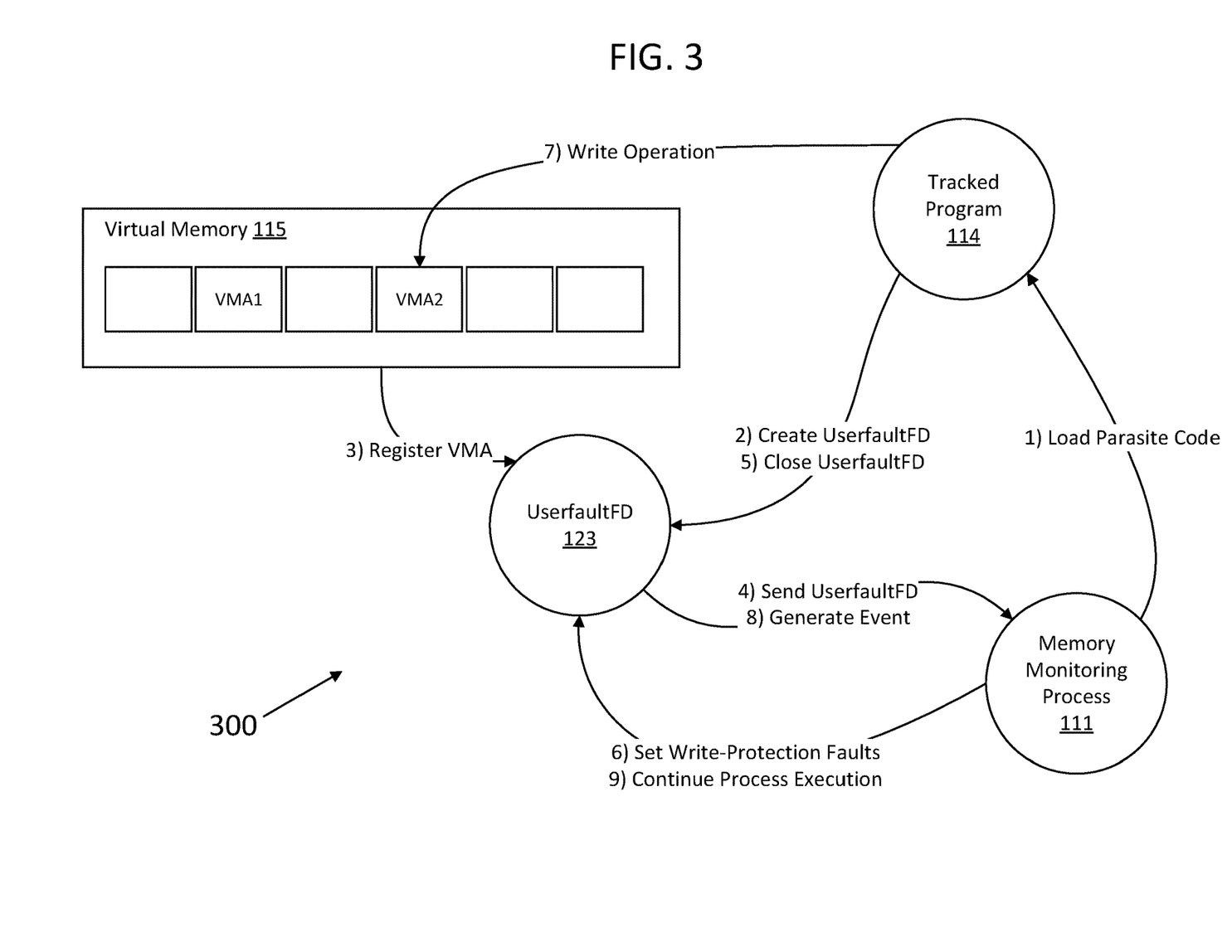
FIG. 3 illustrates a flow diagram for tracking changes in process memory according to an exemplary aspect.

FIG. 3 illustrates a flow diagram 300 for the computing system 100 for tracking changes in system memory according to an exemplary aspect. It should be appreciated that the components shown in FIG. 3 correspond to the same components described above, including, for example, the memory monitoring process 111 (i.e., the tracker task), the tracked program 114, the userfaultfd 123 (i.e., the memory access tracking file), and the virtual memory 115. Moreover, the flow diagram is generally shown to include steps 1 to 9.

Thus, as shown, initially at step 1, the memory monitoring process 111 is configured to load the parasite code using Compel, for example, in the tracked program 114. It is noted that the tracked program 114 can be selected automatically by the computing system 100 or manually by a user of the computing system 100. For example, if the user or an application indicates that the process 114 (e.g., and so the memory of the tracked process 114) is to be migrated, the memory monitoring process 111 can automatically load the parasite code into the process 114, as described above. Thus, according to an exemplary aspect, the memory monitoring process 111 can be implemented as a service daemon that works reactively in that it starts monitoring any process memory only if some other task (e.g., tracked program 114) instructs the memory monitoring process 111 to initiate monitoring. One example is a live migration utility (e.g., CRIU) as described above with respect to FIG. 2 that asks the memory monitoring process 111 to initiate monitoring of the pages in the process (e.g., 114) memory. Another example is a system monitoring system that collects information about memory usage of the host. In one aspect, the ID of the process to be tracked/monitored can be passed to the memory monitoring process 111 by any means in the operating system, such as command line options, environment variables, RPC channels, or the like.

Upon receiving a command (and, for example, the ID of the tracked program 114), the memory monitoring process 111 then causes the parasite code to be loaded into the address space of tracked process or processes (e.g., upon receiving the ID of the tracked program 114, i.e., a process or a set of processes). Once loaded, the parasite code is executed and configured to create the memory access tracking file (i.e., userfaultfd 123) at step 2. Once the memory access tracking file is created, the tracked program 114 (i.e., a parasite code inside of it) registers a virtual memory area (e.g., "VMA2") to the memory access tracking file at step 3. Then, at step 4, the tracked program 114 (i.e., a parasite code inside of it) sends the memory access tracking file to the memory monitoring process 111 by a Unix domain socket (e.g., an inter-process communication (IPC) socket), for example, (or pipe or any other inter-process communication mean) that serves as a data communication endpoint for exchanging data between the parasite code executing in the tracked program 114 and the memory monitoring process 111. At step 5, the tracked program 114 (i.e., parasite code in it) closes its file descriptor of the memory access tracking file (i.e., file descriptor belonging to the tracked program 114), such that the memory monitoring process 111 can begin tracking memory access by the tracked program 114.

Then, (for example, after the memory access tracking file is closed) the memory monitoring process 111 is configured to configure the pages in the virtual memory 115 of the process 114 so that the page fault is generated when the process 114 tries to write (or even just access, in other aspects) to them at step 6. It can be done, for example, by set write-protection bits to all such pages, or unmapping them, etc. For example, virtual pages of virtual memory 115 may be assigned different protection domains, which can include write-protection bits and read-protection bits, for example. Thus, in an aspect, the memory monitoring process 111 (using kernel API) can set the write-protection bit of each virtual page to disable write operations by the tracked program 114. As a result, the write-protection will cause page faults to be triggered when the tracked program 114 attempts to write to one or more virtual pages (e.g., virtual page 116) in process virtual memory 115. Thus, when the tracked program accesses the virtual memory 115 (e.g., by executing a write operation), at step 7, the kernel generates a corresponding event at step 8 that identifies the virtual page and sends the generated event to the memory monitoring process 111. Upon receipt of the event, the memory monitoring process 111 can instruct the kernel to remap a physical page (e.g., physical page 122) to the virtual page 116 or to change page attributes responsible for permissions (e.g., to delete write protection bit); and/or mark the page as a changed page by updating the bitmap accordingly. Finally, once the changed page has been tracked (and when the page fault exception has been handled), the memory monitoring process 111 can permit the tracked program 114 to continue its execution. In some aspects, subsequent write operations to the virtual page 116 will not trigger the page fault and can be executed successfully.

Figure 4:
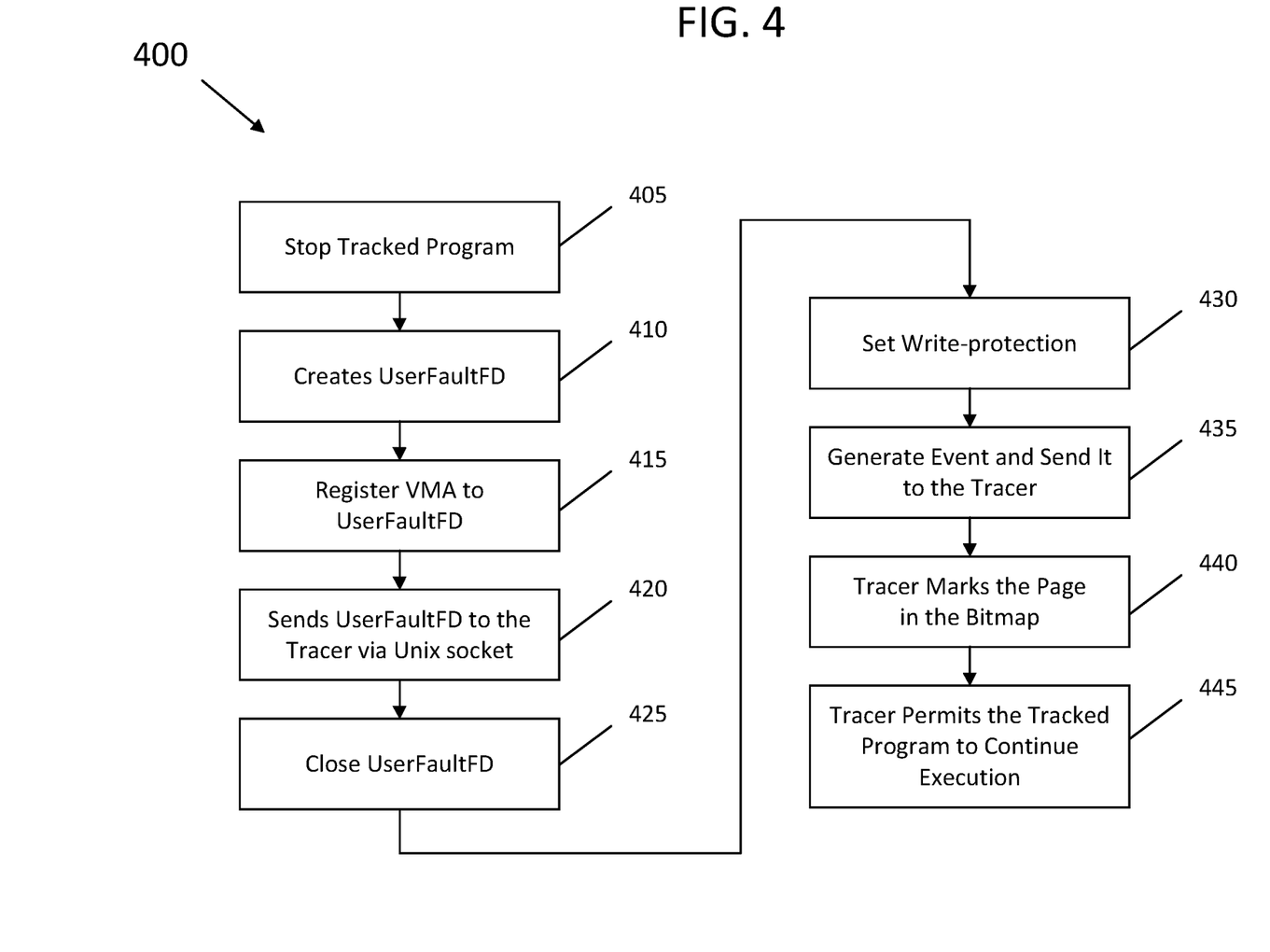
FIG. 4 illustrates a flowchart of a method for tracking changes in process memory according to an exemplary aspect.

FIG. 4 illustrates a flowchart of a method for tracking changes in system memory according to an exemplary aspect. The method 400 corresponds to the flow diagram 300 described above. As shown, initially at step 405, the running program/task that is to be tracked is stopped to load the parasite code. For example, as described above, the tracker task (i.e., the memory monitoring process 111) can utilize the Compel utility, for example, to create and compile the parasite code before connecting to the tracked program 114 using a debugging program interface of the Linux operating system to stop the tracked program 114. In the process address space, the Compel utility can identify a white space and write the parasite code so that it is loaded into the tracked program 114. Once loaded, the parasite code creates the memory access tracking file (i.e., the userfaultfd 123) at step 410 before it is then registered by the tracked program 114 at step 415 to a virtual memory area associated with the process memory for the tracked program 114.

Next, at step 420, the tracked program 114 sends the memory access tracking file (userfaultfd 123) to the memory monitoring process 111 using, for example, a Unix socket that is associated with the file descriptor 113. The tracked program then closes the userfaultfd 123, at step 425, then in step 430 the memory monitoring process 111 sets the write protection bits for the virtual memory that are set to trigger page faults upon write operations by the tracked program 114 to the virtual memory 115. In particular, at step 435, when the tracked program attempts to execute a write operation to a specific virtual page (e.g., virtual page 116), the userfaultfd 123 delivers an event (generated by OS kernel) to the memory monitoring process 111. The memory monitoring process 111 then updates the bitmap at step 440 by marking the changed page before permitting the tracked program to continue execution at step 445. It should be appreciated that steps 435 to 445 can be repeated such that the memory monitoring process 111 can continue to monitor and track all changed pages resulting from memory access operations executed by the tracked program 114.

As described above in the exemplary aspect, a single tracker task (i.e., the memory monitoring process 111) is provided to track a single process or task (e.g., tracked program 114). However, it should be appreciated that the memory monitoring process 111 can track multiple processes with a separate userfaultfd created for each process, as described above, and indexed to a particular file descriptor in file descriptor table 112 of the memory monitoring process 111. Moreover, in an alternative aspect, two or more monitoring processes can be provided in user space 110 for a single process to be tracked. In other words, in user space 110, a multi-monitor scheme can be implemented in which different monitoring processes can track a single (or multiple) process memory usage. The multi-monitoring scheme is not possible in kernel space 120 as only a single process can successfully handle process memory tracking.

Figure 5:
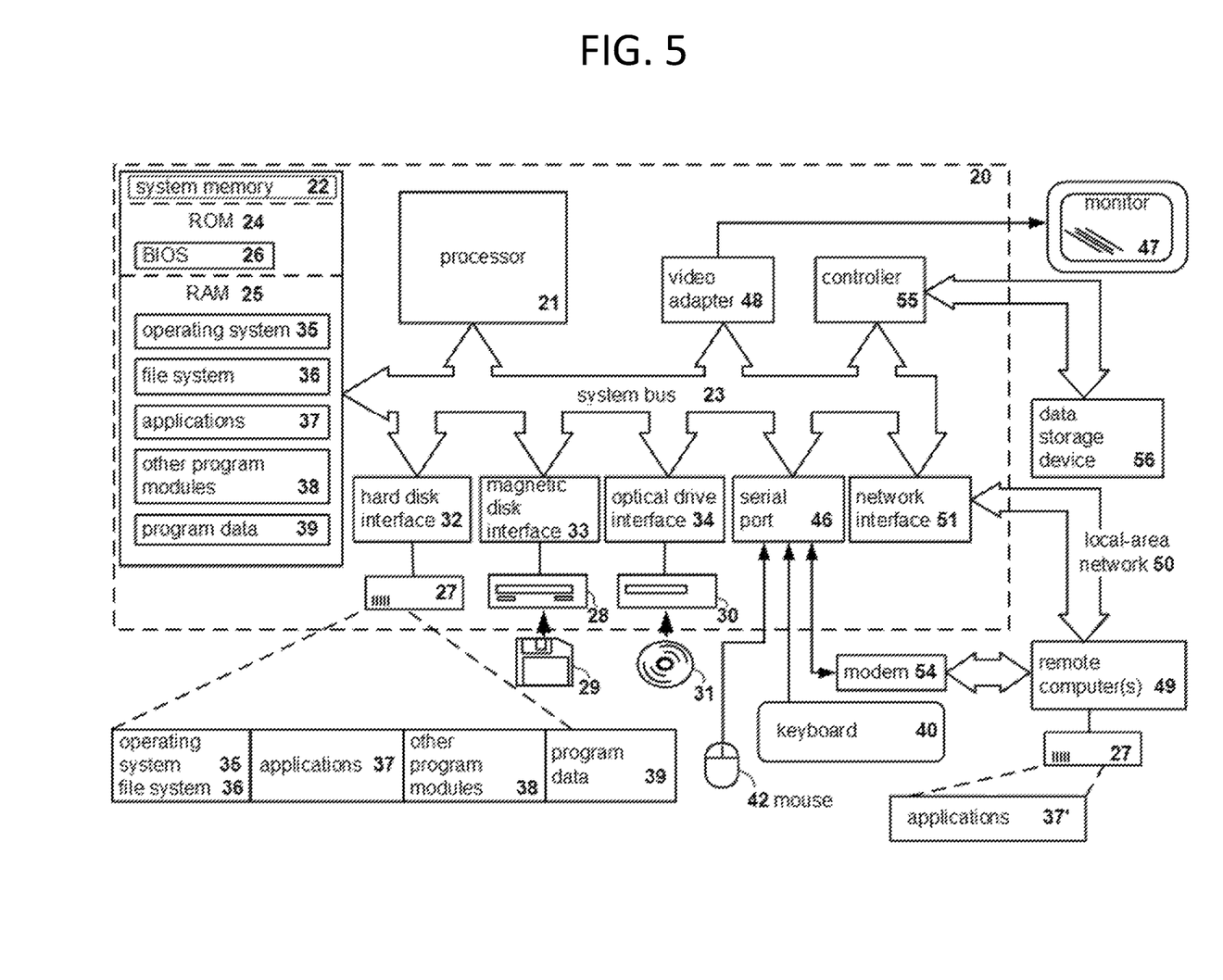
FIG. 5 illustrates a block diagram of an example of a general-purpose computer system on which the disclosed system and method can be implemented according to an exemplary aspect.

FIG. 5 illustrates a block diagram of an example of a general-purpose computer system on which the disclosed system and method can be implemented according to an exemplary aspect. It should be appreciated that the detailed general-purpose computer system can correspond to a computing system 100 described above. Moreover, the operating system 35 can correspond to Linux operating system provided on the computing system 100, as also described above with respect to the exemplary aspect.

As shown, the computer system 20 includes a central processing unit 21, a system memory 22 and a system bus 23 connecting the various system components, including the memory associated with the central processing unit 21. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for tracking changes in process memory, the method comprising:
   referencing a memory access tracking file associated with a tracked process to a file descriptor of a memory monitoring process by:
   loading, via the memory monitoring process, executable code into an address space of the tracked process, wherein the executable code contains instructions for creating the memory access tracking file;
   temporarily stopping, by the memory monitoring process, the tracked process when loading the executable code into the address space of the tracked process;
   sending, by the executable code executed in the tracked process, the memory access tracking file to the file descriptor of the memory monitoring process; and
   closing a file descriptor of the tracked process corresponding to the memory access tracking file;
   registering at least one virtual memory area of the tracked process to the memory access tracking file;
   sending, via the memory access tracking file, event information of a write access to the memory monitoring process that identifies a virtual page, the write access performed by the tracked process to the virtual page in the at least one virtual memory area; and
   configuring the virtual page such that the tracked process can execute a subsequent write command to the virtual page.

2. The method according to claim 1, further comprising tracking, using the memory access tracking file, page faults generated when the tracked process attempts to execute write commands to virtual pages in virtual memory of the tracked process.

3. The method according to claim 2, further comprising delivering, via the memory access tracking file, the event information based on at least one tracked page fault to the memory monitoring process, wherein the event information includes location information of the virtual page that corresponds to the at least one tracked page fault.

4. The method according to claim 1, wherein the virtual memory area of the tracked process comprises a whole address space of the tracked process.

5. The method according to claim 1, wherein the virtual memory area of the tracked process comprises one or more address ranges in virtual memory of the tracked process.

6. The method according to claim 1, further comprising marking, by the memory monitoring process, the identified virtual page as accessed by the tracked process.

7. The method according to claim 1, further comprising:
setting write protection to one or more memory pages of the tracked process; and
tracking, using the memory access tracking file, page faults generated when the tracked process attempts to execute write commands to the one or more memory pages,
wherein, when the virtual page is one of the one or more memory pages, configuring the virtual page further comprises deleting write protection from the virtual page depending on a type of the page fault.

8. The method according to claim 7, wherein setting write protection to the one or more memory pages of the tracked process is performed by the executable code executed in the tracked process.

9. The method according to claim 1, further comprising updating, by the memory monitoring process, a bitmap of changed virtual pages of the tracked process upon receiving the event information of the write command that identifies the virtual page.

10. The method according to claim 9, further comprising migrating process memory of the tracked process based at least partially on the updated bitmap.

11. The method according to claim 1, wherein the virtual page is configured such that the tracked process can execute the subsequent write command to the virtual page without occurrence of a page fault in system memory.

12. The method according to claim 1, wherein configuring the virtual page comprises one of remapping a physical page in kernel space of system memory as full access for the virtual page such that the tracked process can execute a subsequent write command to the virtual page; and deleting a write protection from the virtual page depending on a type of page fault.

13. The method according to claim 12, further comprising remapping, by the memory monitoring process, the physical page in the kernel space by sending a link of the physical page to a kernel that remaps the physical page to the virtual page.

14. A computing system for tracking changes by a software program, the computing system comprising:
system memory; and
at least one processor configured to:
reference a memory access tracking file associated with a tracked process to a file descriptor of a memory monitoring process by:
loading, via the memory monitoring process, executable code into an address space of the tracked process, wherein the executable code contains instructions for creating the memory access tracking file;
temporarily stopping, by the memory monitoring process, the tracked process when loading the executable code into the address space of the tracked process;
sending, by the executable code executed in the tracked process, the memory access tracking file to the file descriptor of the memory monitoring process; and
closing a file descriptor of the tracked process corresponding to the memory access tracking file;
register at least one virtual memory area of the tracked process to the memory access tracking file;
send, via the memory access tracking file, event information of a write access to the memory monitoring process that identifies a virtual page, the write access performed by the tracked process to the virtual page in the at least one virtual memory area; and
configure the virtual page such that the tracked process can execute a subsequent write command to the virtual page.

15. The computing system according to claim 14, wherein the at least one processor is further configured to:
track, using the memory access tracking file, page faults generated when the tracked process attempts to execute write commands to virtual pages in virtual memory of the tracked process; and
deliver, via the memory access tracking file, the event information based on at least one tracked page fault to the memory monitoring process, wherein the event information includes location information of the virtual page that corresponds to the at least one tracked page fault.

16. The computing system according to claim 14, wherein the memory monitoring process is configured to mark the identified virtual page as accessed by the tracked program.

17. The computing system according to claim 14,
wherein the memory monitoring process sets write protection to memory pages of the tracked process, and
wherein the executable code executed in the tracked process sets write protection to one or more memory pages of the tracked process; and
tracks, using the memory access tracking file, page faults generated when the tracked process attempts to execute write commands to the one or more memory pages,
wherein, when the virtual page is one of the one or more memory pages, configuring the virtual page further comprises deleting write protection from the virtual page depending on a type of the page fault.

18. The computing system according to claim 14, wherein the memory monitoring process updates a bitmap of changed virtual pages of the tracked process upon receiving the event information of the write command that identifies the virtual page; and
wherein the at least one processor is further configured to migrate process memory of the tracked program based at least partially on the updated bitmap.

19. The computing system according to claim 14, wherein the virtual page is configured such that the tracked process can execute the subsequent write command to the virtual page without occurrence of a page fault in the system memory.

20. The computing system according to claim 14, wherein the at least one processor configures the virtual page by at least one of remapping a physical page in kernel space of the system memory as full access for the virtual page such that the tracked program process can execute a subsequent write command to the virtual page; and
deleting a write protection from the virtual page depending on a type of page fault, and wherein the memory monitoring process remaps the physical page in the kernel space by sending a link of the physical page to a kernel that remaps the physical page to the virtual page.

21. A computing system for tracking changes in memory, comprising at least one processor configured to:
- run a tracked program in user space, the tracked program configured to register at least one virtual memory area of the tracked program to a memory access tracking file;
- run a memory monitoring program in the user space having a file descriptor table including a file descriptor referencing to the memory access tracking file, the memory monitoring program configured to:
  - load executable code into an address space of the tracked program, wherein the executable code contains instructions for creating the memory access tracking file and wherein the executable code sends the memory access tracking file to the file descriptor of the memory monitoring process;
  - temporarily stop the tracked program when loading the executable code into the address space of the tracked program;
  - close a file descriptor of the tracked process corresponding to the memory access tracking file;
  - receive, via the memory access tracking file, event information of a access to a virtual memory page in the virtual memory area performed by the tracked program, and
  - mark the virtual page as accessed by the tracked program; and
  - configure the virtual page such that the tracked process can execute a subsequent write command to the virtual page.

22. The computing system according to claim 21, wherein the memory access tracking file is configured to:
- track page faults generated when the tracked process attempts to execute write commands to virtual pages in virtual memory of the tracked program; and
- deliver the event information based on at least one tracked page fault to the memory monitoring process, wherein the event information includes location information of the virtual page that corresponds to the at least one tracked page fault.

23. The computing system according to claim 21, wherein the memory monitoring process is further configured to mark the virtual page as accessed by the tracked program.

24. The computing system according to claim 21,
- wherein the memory monitoring process sets write protection to one or more memory pages of the tracked process, and wherein the executable code executed in the tracked process sets write protection to the memory pages of the tracked process; and
- tracks, using the memory access tracking file, page faults generated when the tracked process attempts to execute write commands to the one or more memory pages, wherein, when the virtual page is one of the one or more memory pages, configuring the virtual page further comprises deleting write protection from the virtual page depending on a type of the page fault.

25. The computing system according to claim 21, wherein the memory monitoring process updates a bitmap of changed virtual pages of the tracked process upon receiving the event information of the write command that identifies the virtual page; and
- wherein at least one processor is further configured to migrate process memory of the tracked program based at least partially on the updated bitmap.

26. The computing system according to claim 21, wherein the virtual page is configured such that the tracked process can execute the subsequent write command to the virtual page without occurrence of a page fault in system memory.

27. The computing system according to claim 21, wherein the memory monitoring process is further configured to:
- configure the virtual page by at least one of remapping a physical page in kernel space of system memory as full access for the virtual page such that the tracked program can execute a subsequent write command to the virtual page, and deleting a write protection from the virtual page depending on a type of page fault, and
- remap the physical page in the kernel space by sending a link of the physical page to a kernel that remaps the physical page to the virtual page.

* * * * *